United States Patent [19]

Sischka

[11] 3,894,306

[45] July 15, 1975

[54] MAGNETIC RECORDING MEDIUM

[75] Inventor: Frederic J. Sischka, Santa Clara, Calif.

[73] Assignee: Memorex Corporation, Santa Clara, Calif.

[22] Filed: Nov. 7, 1973

[21] Appl. No.: 413,579

[52] U.S. Cl. ............ 428/425; 252/62.54; 260/859 R; 428/474; 428/900
[51] Int. Cl. .............................................. H01f 10/02
[58] Field of Search ........................... 117/235–240, 117/161 KP; 252/62.54; 260/859 R

[56] References Cited
UNITED STATES PATENTS

| | | | |
|---|---|---|---|
| 3,144,352 | 8/1964 | Talley | 252/62.54 X |
| 3,387,993 | 6/1968 | Flowers | 117/235 |
| 3,473,960 | 10/1969 | Jacobson et al. | 117/237 |
| 3,617,378 | 11/1971 | Beck | 117/235 X |
| 3,819,411 | 6/1974 | Kitamoto et al. | 117/235 |

*Primary Examiner*—Bernard D. Pianalto

[57] ABSTRACT

A magnetic recording medium comprising a plastic base and an adherent coating comprising acicular gamma ferric oxide having an appreciable content of ferrous iron dispersed in a resinous binder consisting essentially of a polyurethane resin, a copolymer of vinylidene chloride and acrylonitrile, a diimide, a divalent lead salt, a free radical chain reaction inhibitor and a dispersant is described.

2 Claims, No Drawings

MAGNETIC RECORDING MEDIUM

BACKGROUND OF THE INVENTION

U.S. Pat. No. 3,144,352 describes a long wear magnetic recording medium comprising a plastic base and an adherent coating, including a magnetic pigment dispersed in a resin mixture. The resin mixture is a mixture of a polyurethane resin and a copolymer of vinylidene chloride and acrylonitrile in which the polyurethane resin content is at least 5% of the total resin mixture.

Polyurethane resins are made by reacting a diisocyanate, a dicarboxylic acid and an alkane diol in proportions such that all of the isocyanate groups have reacted to give a substantially unreactive polymer.

The vinylidene chloride-acrylonitrile copolymers contain in excess of 50% by weight vinylidene chloride and are sold by Dow Chemical Company under the trade name Saran Resins.

Polyurethane resins manufactured and sold by B. F. Goodrich under the trade names of ESTANE 5740-X-1 and X-2 are prepared by reacting p-p'-diphenylmethane diisocyanate, adipic acid and butane diol-1,4 are extensively used in preparing these resin mixtures.

Magnetic coating compositions employing the resin mixtures described in the above noted patent have had an impressive commercial success.

Since the introduction of magnetic coatings of the kind described in U.S. Pat. No. 3,144,352 acicular gamma ferric oxides have been developed which can be dispersed in a number of binder systems to produce magnetic tape coatings which make possible production of magnetic tapes having considerably improved performance properties. Difficulty, however, has been experienced in attempting to produce an acceptable magnetic tape coating using the improved gamma ferric oxides with the binder system described in U.S. Pat. No. 3,144,352.

When magnetic coatings are prepared using the newly developed gamma ferric oxides in conventional manner, i.e., by forming a solution of a mixture of the vinylidene chloride-acrylonitrile resin and the polyurethane resin, adding the gamma ferric oxide and small amounts of conventional additives such as suspending agents, fungicides, plasticizers, and lubricants and then subjecting the mixture to the customary extended vigorous milling procedure, it is found that initially the tape produced by coating with the resultant mixture is satisfactory but that the system is not chemically stable. During storage the tape coating increases in tensile strength and in brittleness and there is a detectable loss of chlorine from the binder in the form of hydrogen chloride. The tape life is not commercially acceptable.

DESCRIPTION OF THE INVENTION

It has been found that some of the improved gamma ferric oxides as they reach the market contain appreciable amounts of ferrous iron adhering to the ferric oxide. The ferrous iron appears to be in the form of ferrous hydroxychloride or ferrous oxychloride. These materials appear to be present in amounts such that the gamma ferric oxide has a ferrous iron content above 100 ppm and up to about 1500 ppm. These small amounts of ferrous iron appear to catalyze or induce reactions which cause an increase in tensile strength and development of brittleness when the tape is exposed to elevated temperature during storage or shipment. The reaction system is complex and the reactions which result in poor storage properties are difficult to pin down. Study of the problem, however, indicates that hydrolysis of the polyurethane, chlorine loss as HCl from the vinylidene chloride-acrylonitrile copolymer and free radial cross linking in the resin system are catalyzed or induced by the ferrous iron. Incorporation in the coating composition of inhibitors adapted to retard each of these reactions provides chemical storage stability in the finished tape coating.

A detailed description of the preparation of a magnetic tape pursuant to the invention follows.

Resin Solution No. 1, Slurry for Mill Feed and Resin Solution No. 2 having the following compositions in parts by weight were prepared.

| Component | Weight Parts |
| --- | --- |
| Resin Solution No. 1 | |
| 1. Cyclohexanone | 22.5557 |
| 2. ESTANE X-1 | 1.2256 |
| 3. Xylene | 5.6389 |
| 4. Diimide* | 0.0122 |
| Total | 29.4324 |

*This diimide has the formula H—N=C=N—H

| Slurry/Mill Feed | |
| --- | --- |
| 1. Resin No. 1 | 29.4324 |
| 2. Soya Lecithin | 0.6924 |
| 3. Metasol-57* | 0.0046 |
| 4. Oxide-MO2228** | 23.0800 |
| Total | 53.2094 |

*Diphenyl mercuric ammonium propionate fungicide by Metal Salts Corp.
**Oxide MO2228 is an acicular gamma ferric oxide sold by Pfizer Chemical Co. It contains approximately 1250 ppm of ferrous iron predominantly in the form of Fe(OH)Cl.

| Resin Solution No. 2 | |
| --- | --- |
| 1. Cyclohexanone | 33.4436 |
| 2. Diphos (Dibasic Lead Phosphite) | 0.0295 |
| 3. 1,4-Benzoquinone | 0.0295 |
| 4. Saran F-130* | 4.9025 |
| 5. Xylene | 8.3855 |
| Total | 46.7906 |

*Saran F-130 is manufactured by Dow Chemical Company. It is a vinylidene chloride-acrylonitrile copolymer containing about 85% by weight of vinylidene chloride.

Letdown

1. Resin Solution No. 2
2. Additive '1' (butoxy-ethyl stearate)
3. Silicone (DC 200)

1. Resin Solution No. 1 Make Up
   a. 2.2556 kg of cyclohexanone is transferred to a pre-tared stainless steel container (5 gallon capacity).
   b. Stirring is started with a Cowles mixer (7 inch blade) at 700 rpm.
   c. 0.1226 kg of ESTANE resin X-1 is slowly added to the stirring mixture. Stirring is continued for 3 hours to assure complete solution of the polyurethane.
   d. Upon completion of the 3 hour stir period, 0.5639 kg of xylene is added with stirring continuing for 15 minutes.
   e. 1.23 g of poly(carbo)diimide is added with stirring continuing for 15 minutes.

2. Slurry/Mill Feed
   a. The 2.9432 kg of resin solution No. 1 thus prepared is stirred while adding the following components.
   b. 69.24 g of soya lecithin added over 5 minutes.
   c. 0.5 g of Metasol-57 is added to mix over 5 minutes.
   d. 2.3080 kg of MO2228 oxide is added with stirring over a 15 minute period.
   e. Stirring is continued at 1500 rpm for a further time of 30 minutes.
3. Milling
   a. The slurry, as prepared above in Step 2, is placed in the feed tank for milling.
   b. The perl mill (Drais) is started and cooling water is adjusted to minimum flow.
   c. Mix feed pump is started and flow rate on the mill is adjusted to 2 gph. The first slurry through the mill is discarded as mill purge.
   d. Continue milling at 2 gph until the feed pot is empty. Shut down the mill and transfer the first pass material into the feed pot.
   e. Start the mill and feed pump and continue as above (without purge) for passes 2, 3 and 4.
   f. At the conclusion of pass 4, remove samples for viscosity and optical examination of dispersion quality.
4. Resin Solution No. 2 Make Up
   a. 3.3444 kg of cyclohexanone is transferred to a pretared stainless steel container.
   b. Stirring is started with a Cowles mixer (7 inch blade) at 700 rpm.
   c. 2.95g of Diphos is added with stirring.
   d. 2.95g of 1,4, Benzoquinone is added with stirring.
   e. 490.25g of Saran resin F-130 is slowly added to the stirring mixture. Stirring is continued for 2 hours to assure complete solution of the polymer. The mixture will retain a slight cloudy nature as the diphos will not dissolve in organic solvents.
   f. Upon completion of the two hour stir period, 838.55g of xylene is added with stirring continued for 15 minutes.
5. Letdown to Final Mix
   a. The dispersion prepared in milling step 3 is weighed to the nearest 10 gram increment.
   b. Stirring is started with a Cowles mixer (7 inch blade) at 700 rpm.
   c. The dispersion weight is multiplied by 0.88 to calculate the weight of resin No. 2 to be added for letdown. This amount of resin No. 2 is added with stirring over a 30 minute period and stirring is continued for a further 30 minutes after addition is completed.
   *d. Final letdown weight is noted and multiplied by 0.0006 to obtain the weights of additive '1' and silicone oil to be added. Both oils are stirred in over a 15 minute period and stirring continues for another 15 minutes.
   **e. Mix is ready for coating procedures.

*Note: For tensile properties testing, the silicone oil addition is deleted.
**Before coating, a sample is drawn off for viscosity and solids check.

The coating is spread on Mylar tape, the magnetic particles are oriented and the tape is dried in conventional manner.

The finished tape coating is storage stable, has superior high frequency response (due to the absence of debris generated by chemical instabilities) and withstands repeated cycles of winding and unwinding with very little loss in high frequency signal strength.

The dried coating of the finished tape produced pursuant to the above described process contains 4.07% by weight polyurethane, 16.3% by weight of the vinylidene chloride-acrylonitrile copolymer, 0.4% by weight of the diimide, 0.06% by weight of dibasic lead phosphite, 0.06% by weight of 1,4-benzo quinone, 2.3% by weight lecithin, 0.1% by weight butoxy-ethyl stearate and 0.1% by weight dimethyl polysiloxane, 0.017% by weight diphenyl mercuric ammonium propionate fungicide and the remainder gamma ferric oxide.

Satisfactory tapes were obtained when the proportions of the several components are varied within the following ranges: polyurethane resin 3 to 5%, vinylidene chloride-acrylonitrile 12 to 20% (the total content of the two resins being in the range 18 to 22%), the diimide 0.03 to 0.05%, the divalent lead salt 0.05 to 0.15%, the benzoquinone 0.05 to 0.15%, the lecithin 1.5 to 3%, the diphenyl mercuric ammonium propionate 0.01 to 0.03%, the butoxy-ethyl stearate 0.08 to 0.15 %, the dimethylpolysiloxane 0.08 to 0.15%, and the remainder of the coating to complete 100% is gamma ferric oxide.

In the above described coating the diimide appears to function to suppress hydrolysis of the resin system. Suitable diimides are HN=C=NH and diimides having the formula

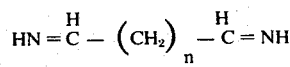

in $n$ is 1 to 4 which are effective when used in equal molar quantities.

The lecithin functions as a dispersing agent for the gamma ferric oxide in the milling process. Other dispersants such as zinc naphthonate, dioctyl sodium sulfosuccinate, esters of oleic acid, lignin sulfonic acid and the like are effective to facilitate the dispersion of the gamma ferric oxide particles during the milling process.

The dibasic lead phosphite functions to suppress loss of chlorine in the form of HCl from the vinylidene chloride-acrylonitrile copolymer. Other dibasic lead salts, such as lead acetate, solution in the organic solvents may be employed but the dibasic lead phosphite is preferred since the phosphite portion of the molecule appears to have some chelating action on ferrous iron.

The diphenyl mercuric ammonium propionate is the preferred fungicide and is included to suppress the formation of mildew and fungus on the tape during storage especially at high humidity. This material is a preferred fungicide but other fungicides compatible with the several components of the coating may be employed, if desired.

The benzoquinone appears to function to suppress the free radical cross linking and resultant development of brittleness in the coating. Phenols and other quinones inhibit free radical chain reactions and can be employed to inhibit cross linking, if desired.

The silicone oils are conventional lubricants in the production of magnetic tapes and silicone oils other than the dimethyl polysiloxane shown in the example may be employed.

The butoxy ethyl stearate functions to plasticize the resin. It is an effective plasticizer, but other conventional plasticizers may be used, if desired.

It will be noted in the above example that the milling step is carried out with only the polyurethane resin being present in the mixture. The vinylidene chloride-acrylonitrile copolymer is not added to the mixture until the milling is complete. This procedure is preferred because it avoids subjecting the copolymer to the high temperatures developed during the milling process which tend to accelerate the chlorine loss as HCl. This procedure is preferred, but with the three inhibitors present acceptable magnetic tape coatings can be produced when both the polyurethane and vinylidene chloride-acrylonitrile resins are both present during the milling process.

I claim:

1. A magnetic recording medium comprising a plastic base and an adherent coating, said coating comprising an acicular gamma ferric oxide having an appreciable content of ferrous iron dispersed in a resinous binder consisting essentially of:
    a. a polyurethane resin prepared by reacting p-p'diphenylmethane diisocyanate, adipic acid and butane diol 1-4 in proportions such that all of the isocyanate groups have reacted to give a substantially unreactive polymer,
    b. a copolymer of vinylidene chloride and acrylonitrile and containing in excess of 50 percent by weight of vinylidene chloride
    c. a diimide selected from the group consisting of $HN=C=NH$ and diimides having the formula $$HN = \overset{H}{C} - (CH_2)_n - \overset{H}{C} = NH$$

in which $n$ is 1 to 4
    d. a divalent lead salt selected from the group consisting of lead acetate and dibasic lead phosphate
    e. benzoquinone and
    f. a dispersant
the portions of a, b, c, d, e and f being such that they constitute respectively 3 to 6%, 12 to 20%, 0.03 to 0.05%, 0.05 to 0.15%, 0.05 to 0.05% and 1.5 to 3% by weight of the total adherent coating.

2. The adherent coating defined in claim 1 containing, in addition, diphenyl mercuric ammonium propionate and butoxyethyl stearate in amounts sufficient to constitute from 0.01 to 0.03% and from 0.08 to 0.15% respectively of the total adherent coating.

* * * * *